Figure 8:
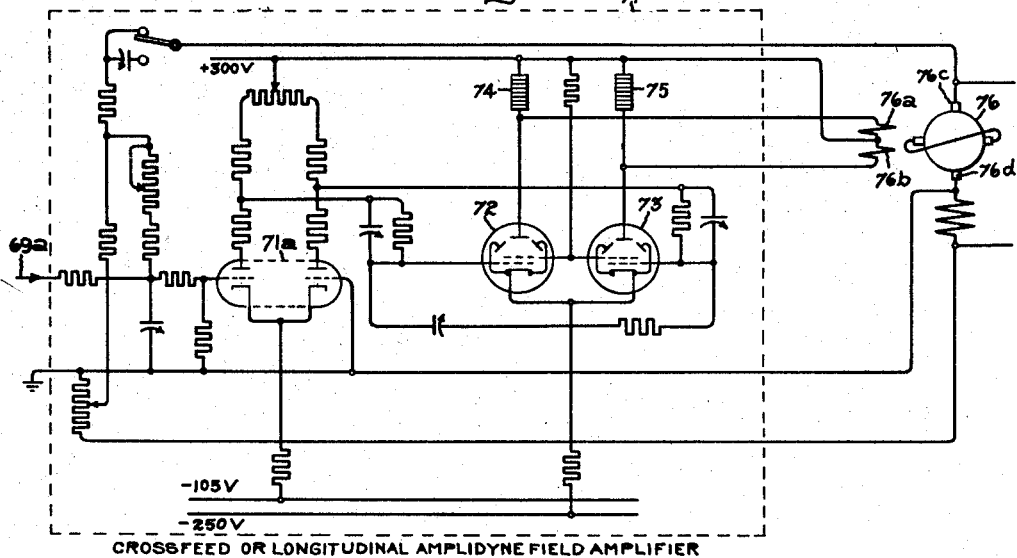

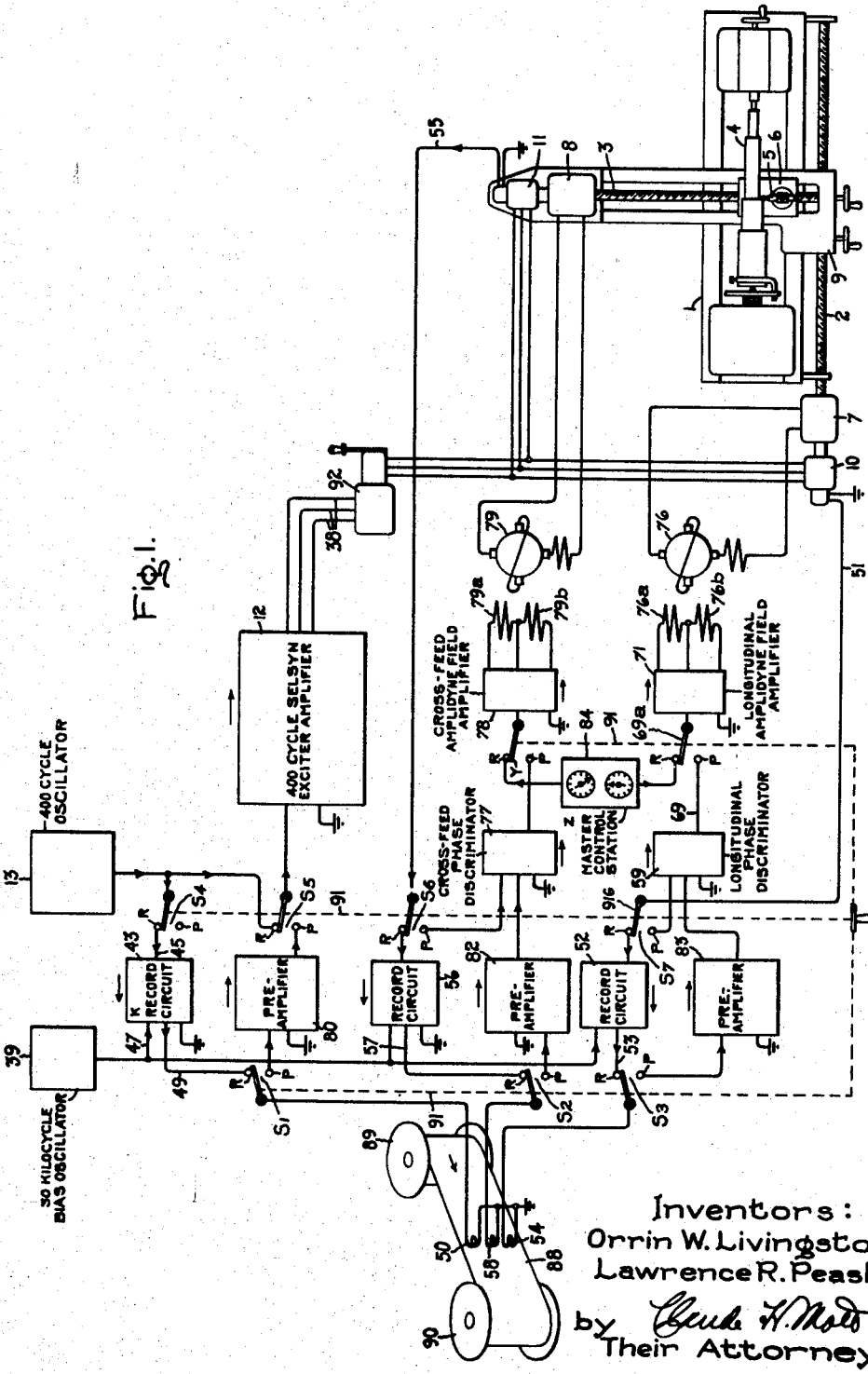

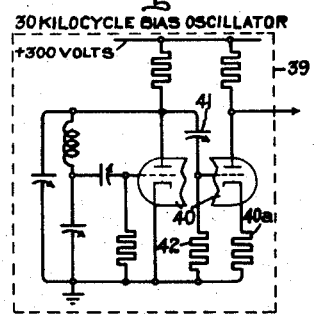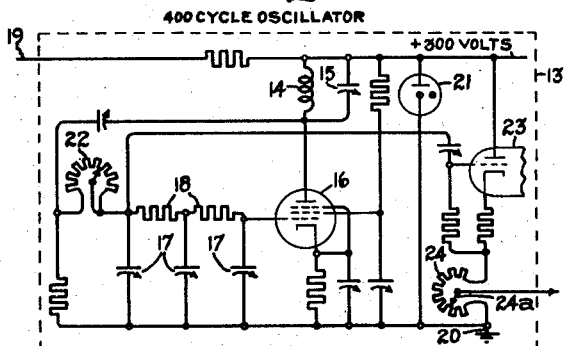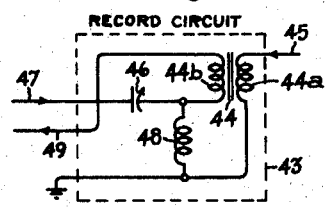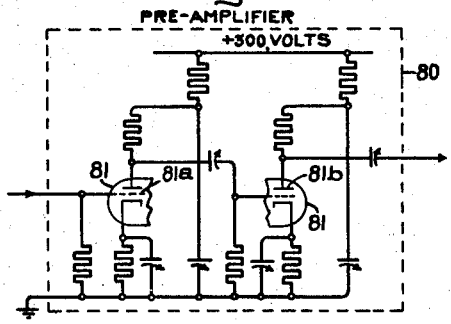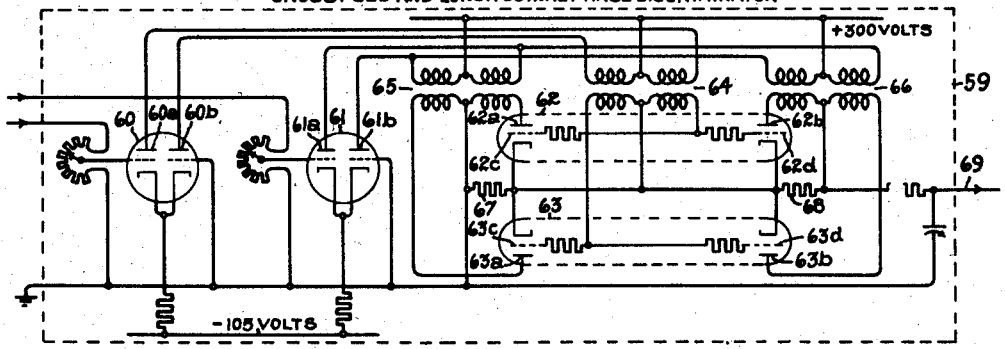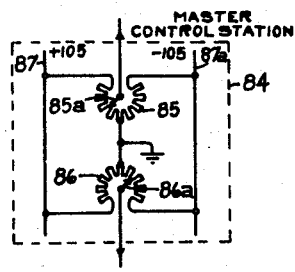

CROSSFEED OR LONGITUDINAL AMPLIDYNE FIELD AMPLIFIER

400 CYCLE SELSYN EXCITER AMPLIFIER

D.C. OUTPUT VOLTAGE OF PHASE DISCRIMINATOR
CONTROL ZONE
PHASE ANGLE BETWEEN INPUT VOLTAGES OF VALVES 60 AND 61

Inventors:
Orrin W. Livingston,
Lawrence R. Peaslee,
by *Claude A. Moto*
Their Attorney.

Patented Jan. 9, 1951

2,537,770

UNITED STATES PATENT OFFICE 2,537,770

PROGRAMMING CONTROL SYSTEM

Orrin W. Livingston, Scotia, and Lawrence R. Peaslee, Schenectady, N. Y., assignors to General Electric Company, a corporation of New York Application February 17, 1949, Serial No. 76,888

4 Claims. (Cl. 318—162)

This invention relates to control systems, more particularly to control systems for controlling machines or processes in which a program or sequence is repeated many times and an object of the invention is the provision of a simple, reliable and improved control system of this character.

More specifically, the invention relates to systems for controlling a program of sequential operations and a further object of the invention is the provision of a simple and efficient system for recording a program of motion, speeds, positions or other variable quantities or characteristics and for subsequently playing back the recording and causing the recorded program to reproduce the original sequence of operations with a high degree of accuracy.

In carrying the invention into effect in one form thereof a reference pulsating voltage is recorded on a suitable record. A load device, of which the position, movement, speed or other operating characteristic is to be controlled, is driven by a suitable driving means. The rotor member of a rotary induction device is coupled to be rotated with respect to its stator member in response to movement of the load device. Inductively related windings are mounted on the stator and rotor members. To one of these windings is supplied a periodically varying voltage which is obtained from the source of reference voltage. The other winding is connected to the recording head so that there is recorded on the record a pulsating control voltage of which the phase relationship with respect to the reference voltage varies in response to movement of the load device. On the playback to reproduce the original movement of the load device, the recorded reference voltage and control voltage are reproduced. The reproduced reference voltage is supplied to one winding of the rotary induction device. The other winding of this device is connected to one input circuit of an electronic phase discriminator. To a second input circuit of the phase discriminator is supplied the reproduced control voltage. Any change in the phase relationship of these two input circuit voltages manifests itself at the output terminals as a direct voltage of which the magnitude varies with variations in the phase relationship and of which the polarity changes with opposite departures from a predetermined phase relationship. This direct voltage is utilized to control the driving means to move the load device and simultaneously to rotate the rotor of the induction device in a direction to restore the predetermined phase relationship of the voltages supplied to the input circuit of the discriminator.

Figure 9:
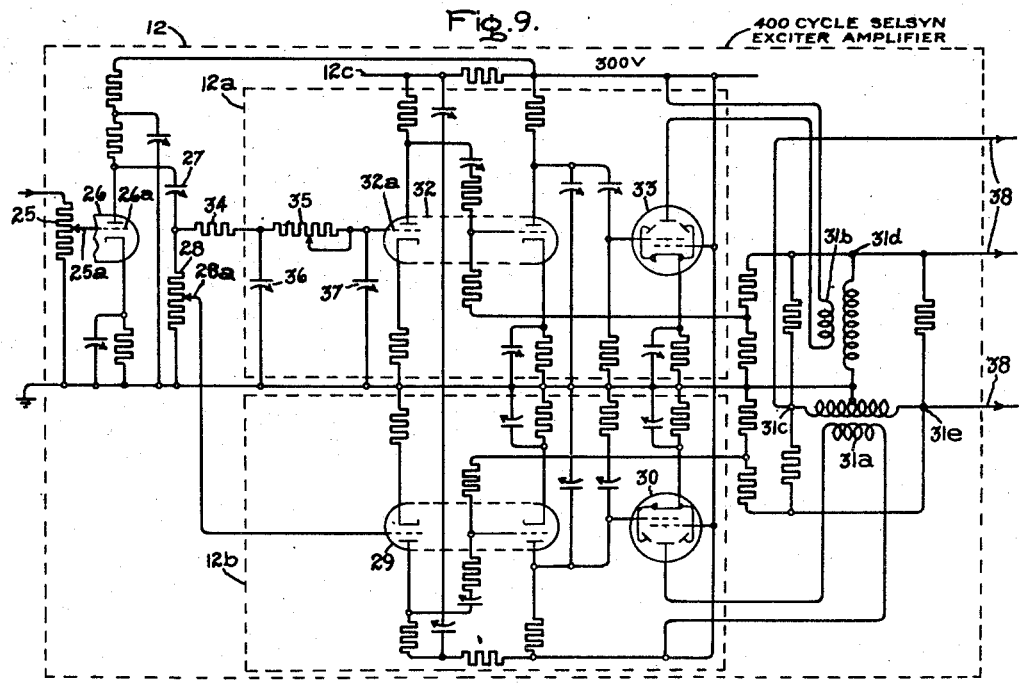
Figure 10:
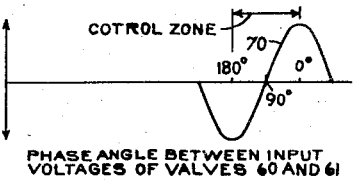

For a better and more complete understanding of the invention, reference should now be had to the following specification and to the accompanying drawing, of which Fig. 1 is a block diagram of a record-playback system applied to the control of a production lathe; Fig. 2 is a simple schematic diagram of a bias oscillator for use during recording; Fig. 3 is a simple schematic diagram of a relatively low frequency oscillator from which all reference and position signal voltages are obtained during the recording operation; Fig. 4 is a schematic diagram of a circuit for mixing a signal voltage with the high frequency bias voltage during recording; Fig. 5 is a two-stage electronic amplifier for amplifying the voltages which are reproduced from the record; Fig. 6 is an electronic phase discriminator for producing a direct control voltage which varies in response to variations in the phase relationship of the input voltages; Fig. 7 is a schematic diagram of a master control station; Fig. 8 is a schematic diagram of an electronic amplifier for amplifying the direct voltage at the output of the discriminator and supplying the amplified voltage to control the driving means for the load device; Fig. 9 is a schematic diagram of an electronic exciter and amplifier unit for converting single phase voltages to three phase voltages and supplying the three phase voltages to the rotary induction device; and Fig. 10 is a curve which facilitates an understanding of the operation of the phase discriminator.

Referring now to the drawing, a production lathe I has a longitudinal feed lead screw 2 and a cross-feed lead screw 3. A workpiece 4 is supported in the usual manner between centers in the head stock and the tail stock and is engaged by a cutting tool 5 which is mounted in a rest on the cross-feed slide 6.

The longitudinal lead screw 2 is driven by suitable driving means which is illustrated as a direct current motor 7. Similarly the cross-feed lead screw 3 is driven by suitable driving means which is illustrated as a direct current motor 8.

For the purpose of providing an alternating voltage of which the phase with respect to the reference voltage varies in response to the movement of the carriage 9, a rotary induction device 10 is provided. This device is a Se'syn which is physically similar to a wound rotor induction motor. It has a rotor member which is mechanically coupled to the longitudinal lead screw 2 and a stator member. A three phase distributed winding (not shown) is mounted on the stator member and an inductively related single phase winding is mounted on the rotor member. This arrangement may be reversed if desired. The rotor member of a similar rotary induction device 11 is mechanically coupled to the cross field lead screw 3.

During the recording operation a three phase alternating voltage is supplied to the three phase primary windings of rotary induction devices 10 and 11 from a Selsyn exciter and amplifier unit 12 which in turn is supplied from an oscillator 13. Although the oscillator 13 may be of any suitable type it is preferred to utilize the electronic oscillator of which the circuits are illustrated in detail in Fig. 3. It is a well known conventional type of oscillator and is described as a resistance-capacitance coupled oscillator. Inductance 14 and capacitor 15 in the anode circuit of the oscillator valve provide a degree of tuning in the anode circuit and the capacitors 17 and resistors 18 in the grid circuit produce a 180 degree shift in the phase of the grid voltage with respect to the anode voltage. Preferably the grid and anode circuits are tuned for oscillation at a relatively low frequency, e. g. 400 cycles. A direct voltage of suitable magnitude is supplied to the anode-cathode circuit of the oscillator valve 16 between the conductor 19 and ground 20. This direct voltage is maintained substantially constant by means of a voltage regulator valve 21.

An oscillating voltage is supplied from the junction point of the potentiometer 22 and resistor 18 to the grid circuit of an electric valve 23 which is connected to operate as a cathode follower. A potentiometer 24 is connected in the cathode circuit. The cathode follower valve 23 reproduces the oscillations of the oscillator valve across the potentiometer 24. The oscillating voltage between the slider 24a and the ground is supplied to the input circuit of the selsyn exciter amplifier unit 12.

This amplifier unit comprises two power amplifiers. One of these power amplifiers is illustrated within the dotted enclosure 12a of Fig. 9 and the other is shown within the dotted enclosure 12b. The input to the entire amplifier unit is supplied across the gain potentiometer 25, to the slider 25a of which is connected the control grid 26a of an electric valve 26 which constitutes a single stage amplifier. A capacitor 27 and a gain potentiometer 28 are connected in series from the anode of valve 26 to ground, which is the negative terminal of a direct voltage supply source of which the conductor 12c represents the positive terminal. From the slider 28a of potentiometer 28, the output of the first stage amplifier valve is supplied to the input of the power amplifier within the dotted enclosure 12b, which is illustrated as comprising both sections of a twin triode electric valve 29 and a beam power tube all connected in cascade. The output of the beam power tube 30 is supplied to one primary winding 31a of a Scott connected transformer.

The power amplifier within the dotted enclosure 12a also comprises both sections of a twin triode electric valve 32 and a beam power tube 33 connected in cascade. From the junction point of capacitor 27 and potentiometer 28, the output of the first stage valve is fed through a resistor 34 and a potentiometer 35 to the control grid 32a of the first section of the twin triode valve 32. The resistor 34, potentiometer 35 and capacitors 36 and 37 constitute a phase shift network to produce a 90 degree phase shift of the input voltage and consequently a 90 degree phase shift of the output voltage which is supplied to the quadrature primary winding 31b of the Scott transformer. Since no phase shift network is provided in the input circuit of the power amplifier within the dotted enclosure 12b, its output voltage which is supplied to the primary winding 31a of the Scott transformer has zero phase shift. Since the voltages which are supplied to the primary windings 31a and 31b are 90 degrees out of phase, a balanced three phase voltage appears at the secondary terminals 31c, 31d and 31e, and this three phase voltage is supplied to the primary windings of the rotary induction devices 7 and 8 to which the secondary of the Scott transformer is connected by means of conductors 38.

During recording it is desirable to supply to the recording head coils a voltage of relatively high frequency, e. g. 30,000 cycles. Owing to its relative high frequency, this voltage is not recorded. Its purpose is to overcome the effect of hysteresis in the magnetic layer of the tape and thus to assure linear reproduction of the lower frequency voltages which are recorded. This high frequency bias voltage is obtained from a suitable source, such as the oscillator 39 illustrated in Fig. 2. This oscillator comprises one section of a twin triode electric valve 40 used as an oscillator valve and the other section of the twin triode which is connected to operate as an amplifier. In the anode circuit of the oscillator section is connected a resistor and across the anode and cathode a capacitor 41 and a resistor 42 are connected in series. From the junction point of capacitor 41 and resistor 42 the output of the oscillator section is supplied to the grid of the amplifier section. The anode of this section and ground constitute the output terminals. A resistor 40a in the cathode circuit of the amplifier section produces degeneration which improves the stability of the amplifier.

The output is supplied to a record circuit 43 in which it is mixed with the low frequency reference voltage which is supplied from the low frequency oscillator 13. As shown in Fig. 4, this record circuit comprises a transformer having a primary winding 44a and a secondary winding 44b. One terminal of the primary winding is connected directly to ground and the other terminal is connected through conductor 45 and the contacts of a record-play switch to the output of the low frequency oscillator 13. One terminal of the secondary winding 44b is connected through a capacitor 46 and conductor 47 to the anode output terminal of the bias oscillator 39. This terminal is also connected through a reactance 48 to ground and the opposite terminal is connected through conductor 49 and contacts of a record-play switch to one terminal of the recording head coil 50, the other terminal of which is grounded. Thus there is supplied to the coil 50 an alternating voltage having a 30,000 cycle component and a 400 cycle component. The 400 cycle component is recorded as a reference voltage.

The single phase secondary winding of the rotary induction device 10 is connected through a conductor 51 and the contacts of a record-play switch to a record circuit 52 in which the low frequency voltage induced in the secondary winding of the rotary induction device is mixed with a high frequency voltage obtained from the bias oscillator 39. This mixed alternating voltage is supplied through the output conductor 53 and contacts of a record-play switch to the recording head coil 54 and the low frequency component of the mixed voltage is recorded on the tape. Similarly the single phase secondary winding of the rotary induction device 11 is connected through a conductor 55 and contacts of a record-play switch to a record circuit 56 in which the low frequency secondary voltage of the rotary induction device is mixed with a high frequency voltage obtained from the bias oscillator 39. The mixed voltage is supplied through conductor 57 and contacts of a record-play switch to the recording head coil 58, and the low frequency component is recorded on the tape. The record circuits 52 and 56 are identical with the record circuit 43 and therefore a description of them is omitted.

During the playback operation the voltage reproduced by the record-playback head coil 54 is compared with the secondary voltage of rotary induction device 10 and any variation in the phase relationship of the two voltages is utilized to control the direct current motor 7 which drives the longitudinal lead screw 2.

To detect variations in phase relationship of these two voltages, a phase discriminator 59 is provided. It is illustrated in Fig. 6. This discriminator unit includes two twin triode electric valves 60 and 61 operating as amplifiers and two twin triode electric valves 62 and 63 operating as switches and rectifiers to produce a direct control voltage in response to variations in phase of the two voltages which are supplied to the input circuits of amplifier valves 60 and 61, respectively. The valve 60 amplifies the voltage reproduced in the coil 54 and the amplified voltage which appears across the two anodes 60a and 60b is supplied through the transformer 64 to the grids of discriminator valves 62 and 63. The single phase voltage which is supplied from the rotary induction device 10 through conductor 51 and the playback contacts of a record-play switch during playback is amplified by the valve 61 and the amplified voltage which appears across the anodes 61a and 61b is supplied through transformers 65 and 66 to the anodes of the discriminator valves 62 and 63. In operation, if the input voltages to the amplifiers are exactly in phase then the voltages supplied to anode 62a and grid 62c will be in phase and similarly the voltages supplied to anode 63a and grid 63c will be in phase and consequently a direct voltage will appear across resistor 67 which is positive at the cathode end. Owing to the polarity of the transformer connections the voltages of the anodes 62b and 63b will be 180 degrees out of phase with the voltages of the grids 62d and 63d, respectively, and the voltage across the resistor 68 will be zero. Thus the voltage across the resistor 67 constitutes the output voltage between the conductor 69 and ground. Under the conditions assumed, the output voltage will be maximum and positive at the conductor 69. Similarly when the input voltages to the amplifier are 180 degrees out of phase, the voltages of anodes 62b and 63b will be in phase with the voltages of grids 62d and 63d, respectively, and a direct voltage will appear across resistor 68. The magnitude of this voltage will be maximum and its polarity will be positive at the cathode end of the resistor. The voltages of anodes 62a and 63a will however be 180 degrees out of phase with the voltages of the grids 62c and 63c, respectively, and the voltage across resistor 67 will be zero. Thus the voltage across resistor 68 will constitute the output voltage and its polarity at the output conductor 69 will be negative. If the input voltages supplied to the amplifiers are 90 degrees out of phase, the direct voltages across the resistors 67 and 68 will be equal and opposite and the output voltage between conductor 69 and ground will therefore be zero. Thus for inphase input voltages the output voltage is maximum and positive at conductors 69. With the input voltage to amplifier valve 61 lagging the input voltage to amplifier valve 62 90 degrees, the output voltage will be zero, and for a 180 degree lagging phase displacement of the input voltages the output is maximum and negative at the conductor 69. For intermediate phase relationships between inphase and 90 degree lagging, the output voltage has corresponding intermediate values and is positive at conductor 69. For intermediate phase relationships between 90 degrees lagging and 180 degrees lagging, the output voltage has corresponding intermediate values and its polarity is negative at the conductor 69. These relationships are illustrated graphically in Fig. 10 in which ordinates of the curve 70 represent the voltage at the output conductor 69 and the zero axis represents ground voltage which is zero. Ordinates above the zero axis represent positive values of voltage at conductor 69 and ordinates below the zero axis represent negative voltages at conductor 69.

The output voltage is amplified by means of a suitable electronic amplifier 71. It is illustrated in Fig. 8 as a two-stage amplifier of which the first stage comprises a twin triode valve 71a with cathode coupling between the two sections of the valve and the second stage comprises the two beam power tubes 72 and 73 with cathode coupling. Resistors 74 and 75 are connected in the anode circuits of the valves 72 and 73 and the voltage across each of the resistors constitutes the output voltage for the corresponding valve. These output voltages are supplied to the control field windings 76a and 76b of a suitable dynamoelectric machine, such as the amplidyne 76. The various grid biases of the valves of amplifier 71 are so chosen that with zero output voltage supplied to the input of the first stage, the two second stage valves will be conducting approximately equal values of current in approximately midrange. Consequenly the control fields 76a and 76b of the amplidyne will be equally and oppositely energized; the net excitation will be zero and the voltage at the load axis brushes 76c and 76d will be zero. When the voltage supplied to the input of the first stage valve is maximum and positive, the current conducted by power valve 72 will decrease and the current conducted by power valve 73 will increase correspondingly. Consequently the current supplied to the control field 76b will be increased to a maximum and the current supplied to control field 76a will be correspondingly decreased thereby to produce a maximum net excitation of the amplidyne and a maximum output voltage which may be assumed to be positive at load brush 76c. Similarly when the voltage supplied to the input of the first stage valve is maximum and negative at the conductor 69a, the voltage at the load axis brushes will be maximum but of reverse polarity. The load axis brushes of amplidyne 76 are connected to the armature of the longitudinal feed motor 7.

A phase discriminator 77, which is in all respects identical with the phase discriminator 59, is provided for producing a direct control voltage during playback in response to variations in phase between the voltage induced in the secondary single phase winding of rotary induction device 11 and the voltage induced in the recording and playback head coil 58. This control voltage is amplified by means of an amplifier 78 which is in all respects identical with the amplifier 71. From the output circuit of amplifier 78 voltages are supplied to the control field windings 79a and 79b of an amplidyne 79. The load axis brush voltage of amplidyne 79 is supplied to the D.-C. motor 8 which drives the cross-feed lead screw 3.

Between the reference voltage record and playback head coil 50 and the input to the amplifier unit 12 is connected a preamplifier unit 80 which is used during the playback operation. It is illustrated conventionally in Fig. 1 and in detail in Fig. 5. Preferably it is a two-stage amplifier of which the first stage comprises one section of a twin triode electric valve 81 and the second stage comprises the second section of the valve with capacitative coupling between the two sections. The voltage induced in the coil 50 during playback is supplied through contacts of a record and playback switch to the input circuit between the grid 81a and ground of the first section of the valve and during playback to the output is supplied from the anode 81b of the record section of the valve through contacts of a record and playback switch to the input of the exciter amplifier unit 12. Similar preamplifier units 82 and 83 are connected between the record and playback head coils 58 and 54 and corresponding input circuits of the cross-feed and longitudinal phase discriminators 77 and 59, respectively.

For the purpose of controlling the operation of the machine tool by hand, a suitable master control station 84 is provided. As shown in Fig. 7, it comprises a pair of potentiometers 85 and 86 which are connected across a source of direct voltage which is represented by the supply lines 87 and 87a. The midpoint of each of the potentiometer resistors is grounded. Assuming that the voltage of the supply lines 87 and 87a is 210 volts and that the supply line 87 is positive, the voltage of line 87 will be 105 volts positive and the voltage of the line 87a will be 105 volts negative with respect to the grounded midtaps. By moving the sliders 85a and 86a to one side or the other of the grounded midtaps, direct voltage signals, reversible in polarity and variable in magnitude, dependent on the potentiometer settings, are supplied to the input circuits of the amplidyne field amplifiers 78 and 71. As a result, the feed motors 8 and 7 will rotate to position the tool. Each of the motors will rotate in a direction corresponding to the direction of displacement of the corresponding slider from neutral and at a speed corresponding to the amount of the displacement.

The magnetic recorder is similar in principle to those widely used in the radio broadcast and entertainment fields. The multiple channel magnetic tape 88 is wound upon a storage or unwinding reel 89. Its outer end is threaded through the recording and playback head and attached to the drum of the winding reel 90. The winding-up reel is driven by suitable driving means, such as an electric motor (not shown) and tension is maintained in the tape by means of an electric motor coupled to the unwinding reel 89 and driven thereby as a generator to provide regenerative braking. Usually a capstan is mounted between the take-up reel and the recording head and the tape passes between the drum of the capstan and a pinch roll. The capstan is driven at a speed which is substantially constant by suitable driving means, such as an induction motor. The driving motors for the reels and capstan constitute no part of the present invention and consequently they are omitted from the drawing in the interest of simplicity. It is sufficient for the purposes of the invention to understand that during the recording and playback operations the tape is drawn past the recording head at substantially constant speed. Between the two operations the tape is rewound on the storage reel 89.

With the foregoing understanding of the elements and their organization in the complete system, the operation of the system itself will readily be understood from the following description.

In operation, the operator chucks his stock workpiece 4 and operates the record-playback switch 91 to the record position, i. e. to the position illustrated in Fig. 1, in which all the movable contacts engage the upper stationary contacts R.

The tool is positioned to a known zero point or reference point. This is accomplished with the assistance of the usual micrometer dials with which the lathe is provided. The movement of the tool to the reference point is effected by using the speed control potentiometers 85 and 86 of the master control station 84. Movement of the slider 85a to the left of its neutral position causes a positive voltage to be supplied to the input circuit of the cross-feed amplidyne field amplifier 78, which in turn supplies the amplified signal to the control field windings 79a and 79b of amplifier 79. The amplidyne supplies armature voltage to the motor 8 of a polarity such that the motor rotates the lead screw 3 to move the tool 5 in toward the work. The further the slider 86a is moved from its neutral position, the faster the tool will move. When the desired position is reached, the slider 85a is returned to its neutral position and the motor 8 is stopped. To move the tool back from the work, the slider 85a is moved to the right of its neutral position so that a negative voltage is supplied to the input circuit of the amplifier 78. This causes the amplifier to reverse the relative excitations of the control field windings of the amplidyne, thereby reversing the polarity of its net excitation. A voltage of reverse polarity is supplied to the armature of the motor 8, causing it to rotate in the reverse direction to withdraw the tool from the work. The longitudinal feed is controlled in a similar manner.

Once the tool is located at the reference point, the recorder is turned on and the magnetic tape begins to move past the record and playback head coils 50, 54 and 58. A 400 cycle signal voltage from the oscillator 13 is supplied through the record contacts to the record circuit 43. In this circuit it is reduced in magnitude and mixed with the 30,000 cycle bias voltage. The resulting signal voltage is supplied through conductor 49 and contacts of the record switch to the coil 50 of the recording head. This causes a track of magnetic signals to be induced on the tape. As previously explained, the 30,000 cycle component of the signal is not recorded owing to its high frequency. The 400 cycle component, which serves as a reference signal, is recorded.

A 400 cycle signal voltage from the oscillator 13 is also supplied through the contacts of the record switch to the Selsyn exciter amplifier unit 12. The three phase output voltage of this unit is supplied to the stator windings of the crossfeed and longitudinal feed rotary induction devices 11 and 10, respectively.

The phase of the single phase voltage induced in the rotor winding of the cross-feed rotary induction device with respect to the reference voltage being recorded on the tape represents the position of the cross-feed and thus represents the position of the tool on the cross-feed axis. This single phase rotor voltage is supplied through conductor 55 and contacts of the record switch to the record circuit 56. In this device it is reduced in magnitude and mixed with the 30 000 cycle bias voltage. The resulting mixed signal is supplied through conductor 57 and contacts of the record switch to the record and playback head coil 58 and the 400 cycle component is recorded on the tape. Thus there is recorded on the tape a signal voltage of which the phase with respect to the reference voltage represents the position of the tool along the cross-field.

In a similar manner position signals from the longitudinal feed rotary induction device 10 are supplied through conductor 51 to the record circuit 52 and mixed with the 30,000 bias voltage. The resulting signal is supplied to the coil 54 and the 400 cycle component is recorded on the tape.

The workpiece may now be turned to the desired shape by manipulating the potentiometers 85 and 86 of the master control station 84, as explained in the foregoing. Alternatively, an automatic contouring control system, such as disclosed in Patent 2,410,295—H. P. Kuehi et al., may be utilized to follow the outline of a pattern and control the motors 8 and 7 to position the tool to reproduce the pattern.

Thus while the work is being continuously turned, the longitudinal and cross-feed positions are being recorded. Simultaneously the reference voltage signal is being recorded.

If the longitudinal feed is stationary, the phase of the signal voltage recorded on the tape by the coil 54 will not change with respect to the reference voltage signal recorded by the coil 50. This constant relationship of the phase of the recorded longitudinal feed signal voltage and the recorded reference signal voltage continues as long as the longitudinal feed is stationary. If during a succeeding instant of time the longitudinal feed moves a predetermined amount, the rotor of the rotary induction device 10 is rotated a corresponding amount and consequently the phase of the voltage induced in its single phase rotor winding is advanced or retarded, dependent upon the direction of the rotation. As the movement of the longitudinal feed continues, the phase of the voltage signal which is recorded varies from instant to instant so that there is recorded on the tape a pattern of varying phase relationships between a reference alternating voltage and a signal alternating voltage which represents the position of the tool from instant to instant on the axis of the longitudinal feed. Similarly, as the position of the tool changes along the axis of the cross-feed, the phase of the voltage induced in the rotor winding of the rotary induction device 11 is advanced or retarded, depending on the direction of the movement of the tool. As the movement continues, the phase of the cross-feed voltage signal which is recorded on the tape varies with respect to the recorded reference voltage so that a pattern is recorded of varying phase relationships between a reference alternating voltage and a signal alternating voltage. This pattern of phase relationship represents the instant to instant position of the tool on the axis of the cross-feed.

When the turning operation is completed, the tool is returned to the zero or reference position in which it was located at the beginning of the recorded operations. The tape 88 is rewound on the storage reel and the switch 91 is moved to the playback position. The turned workpiece is replaced in the lathe by a piece of stock and the recorder is turned on and the tape is again drawn from the storage reel 89 past the record and playback head and wound upon the take-up reel 90.

Alternating voltages will now be induced in the coils 50, 54 and 58, in accordance with the voltages which were previously recorded. The 400 cycle reference voltage which is induced in the coil 50 is amplified by the preamplifier 80 and is supplied to the input of the Selsyn exciter and amplifier unit 12. The three phase output voltage of this unit is supplied to the three phase stator windings of the longitudinal and cross-feed rotary induction devices 11 and 10, respectively.

The phase of the voltage induced in the rotor winding of the cross-feed rotary induction device represents the present instantaneous position of the tool on the cross-feed axis. This signal voltage is supplied to one input circuit of the cross-feed phase discriminator 77. At the same time, a signal voltage is induced in the coil 58, in accordance with the recorded cross-feed signal voltage. This signal voltage which is induced in the coil 58 is amplified by the preamplifier 82 and the amplified voltage is supplied to the second input of the cross-feed phase discriminator 77. The phase of this voltage at each instant represents the recorded or the desired position of the tool on the cross-feed axis at that instant.

The cross-feed phase discriminator 77 compares the phases of these two signal voltages which are supplied to its input circuits. As previously explained, the output of the phase discriminator 77 is a direct voltage which is proportional to the phase error between the desired and the present position signal voltages. At any instant in which the tool is in the desired position on the cross-feed axis, the output voltage of the phase discriminator should be zero so that zero voltage shall be supplied to the cross-feed motor 8. However, the output voltage of the phase discriminator is zero only when the input voltages are displaced from each other 90 degrees in phase. To produce this required 90 degree phase displacement when the tool is in the desired instantaneous position on the cross-feed, a phase shifting device 92 is included in the connections 38. It is preferably a three phase differential Selsyn device, i. e. it has a distributed three phase stator winding and a distributed three phase rotor winding. At the beginning of the playback operation the rotor member is rotated sufficiently to displace the voltage supplied from the rotor winding of the rotary induction device 11 to one input of the phase discriminator 77, 90 degrees with respect to the reproduced voltage supplied to the other input. Thus the two voltages supplied to the inputs of the phase discriminator will be 90 degrees out of phase, the output voltage of the discriminator will be zero and the cross-feed motor 8 will be at standstill when the tool is in the desired instantaneous cross-feed position.

As the tape passes through the recording head the phase of the voltage induced in coil 58 will change in accordance with the phase pattern of the recorded cross-feed voltage.

Consequently an error tends to develop in the instantaneous position of the tool on the cross-feed which results in a change in the 90 degree phase relationship of the voltages supplied to the input circuits of the discriminator 77. This produces a voltage at the output of the discriminator of which the magnitude is proportional to the amount of change in phase of the input voltages and of which the polarity depends upon the sense of the change, i. e. an increase or decrease in the 90 degree relationship. Responsively to this output voltage the motor 8 is energized for rotation in a direction to reduce the error in the position of the tool and simultaneously to rotate the rotor of the rotary induction device 11 to restore the 90 degree relationship of the input voltages which exists when the present position of the tool coincides with the desired position. Although this position correcting operation is described as a single step taking place in an instant of time, it is actually in continuous progress during the playback operation. Thus by tending to reduce the error at all times, the system causes the tool to follow the same cross-feed motions that were recorded.

The correct positioning of the tool in the longitudinal direction is accomplished in a similar manner. The present position signal voltage is induced in the rotor winding of the rotary induction device 10 and supplied to one input circuit of the longitudinal phase discriminator 59 and the recording in the longitudinal channel of the tape induces in the coil 54 a signal voltage which represents the desired longitudinal position of the tool. It is amplified by the preamplifier 83 and supplied to the other input of the phase discriminator 59. The manner in which the corrections in the longitudinal position of the tool are made in successive instants of time is identical with that described for the cross-feed and a repetition of the described operation is therefore omitted.

Thus, the tool is continuously positioned along the cross and longitudinal feeds, following the same program of motion that was recorded. The result is a piece of work that is identical to the first piece which was made by manual control of the lathe.

It is not essential that the reference voltage and the signal voltages from the longitudinal and cross-feed Selsyns 10 and 11 be simultaneously recorded. For many operations it may be desirable to pre-record the reference voltage signal from the oscillator and subsequently to record the signal voltages from the Selsyns in correct relationship with the pre-recorded reference voltage. This is accomplished by separating the movable contacts $S_1$ to $S_7$ of the record and playback switch and operating them to the positions defined by the following chart:

recording head in the direction of the arrow and the 400 cycle reference voltage is recorded in the reference channel by the recording head coil 50.

After this recording is complete, the tape is rewound and the switches $S_1$ to $S_7$ are operated to the positions indicated by the chart for condition No. 2, program recording, and the tape is again passed through the recording head in the direction of the arrow. Under this condition, it will be noted that the coil 50 operates as a pick-up coil with the result that a 400 cycle voltage is induced therein and through the preamplifier 80 to the input circuit of the Selsyn exciter amplifier 12 in which it is converted into three phase voltage and supplied through the phase shifting device 92 to excite the stator windings of the longitudinal and cross-feed Selsyns 10 and 11. The voltages derived from the secondary windings of these Selsyns are passed through their respective record circuits 52 and 56 and are recorded on the tape by recording head coils 54 and 58, respectively. During this time, of course, the longitudinal and cross-feed drive motors 7 and 8 are being manually controlled through the master control station to cause the tool 5 to cut the workpiece 4 to the desired shape and dimensions, as explained at a previous point in the specification. At the completion of the program to be recorded, the magnetic tape is again rewound in preparation for the playback operation.

For the playback operation the switches $S_1$ to $S_7$ are operated to the positions indicated by the chart for condition No. 3, program playback, and the tape is again passed through the recording head in the direction of the arrow. Under this condition the recording head coils 50, 54 and 58 all operate as pick-up coils. The voltage induced in the coil 50 is supplied to the Selsyn exciter amplifier to excite the stator windings of the longitudinal and cross-feed Selsyns and the voltages induced in the coils 54 and 58 are supplied through their respective preamplifiers 83 and 82 to corresponding input circuits of the longitudinal and cross-feed phase discriminators 59 and 77 and the voltages derived from the secondary windings of the Selsyns 10 and 11 are supplied to the second input circuits of the discriminators to effect control of the motors 7 and 8 to reproduce the recorded operations, as described at a previous point in the specification.

It will be noted that the 400 cycle oscillator is used only under condition No. 1, reference recording. If the reference voltage is recorded at the time of manufacture of the tape or at any time prior to recording a work program, the 400 cycle oscillator may be omitted from the control equipment.

Another possibility is to supply a 60 cycle voltage to the recording head coil 50 and to drive the tape at $60/400$ of its normal speed to record the reference voltage. Then under the program recording and playback conditions the tape would

| Switch Contacts | $S_1$ | $S_2$ | $S_3$ | $S_4$ | $S_5$ | $S_6$ | $S_7$ |
|---|---|---|---|---|---|---|---|
| Condition No. 1, Reference Recording | R | Open | Open | R | Open | Open | Open |
| Condition No. 2, Program Recording | P | R | R | Open | P | R | R |
| Condition No. 3, Program Playback | P | P | P | Open | P | P | P |

With the switch contacts connected as indicated under condition No. 1, reference recording, with switch contacts $S_1$ and $S_4$ engaging their cooperating stationary contacts R and the movable contacts $S_2$, $S_3$, $S_5$, $S_6$ and $S_7$ in the open position, the magnetic tape is run through the be run at normal speeds and the desirable effect of the 400 cycle reference voltage would be obtained.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. A programming control system comprising means for reproducing two single phase alternating voltages from a record of two alternating voltages, one of said reproduced voltages being a reference alternating voltage of substantially constant frequency and the second reproduced voltage having a variable phase relationship with respect to said reference voltage, a movable load object, an electric motor coupled to drive said load object, a rotary induction device having a rotor member coupled to said load object and a stator member, a three phase distributed primary winding on one of said members, a single phase secondary winding on the other of said members, an amplifier having a single phase input circuit and a two phase output with the output voltages in quadrature, and a Scott connected transformer having its two phase primary winding connected to said two phase output and having its three phase secondary winding connected to said three phase primary winding of said rotary induction device, connections from said reproducing means to said input circuit of said amplifier for supplying said reference voltage thereto and causing to be supplied to said primary winding of said induction device a three phase voltage of corresponding frequency, an electronic phase discriminator having two input circuits and a direct voltage output with the direct voltage varying in magnitude with variations in the phase relationship of the input voltages and changing in response to opposite departures from a predetermined polarity phase relationship of said input voltages, connections from said reproducing means to one of said discriminator input circuits for supplying said second alternating voltage thereto, connections from said secondary winding of said rotary induction device to the other of said discriminator input circuits for supplying thereto a single phase alternating voltage varying in phase with respect to said reference voltage in response to movements of said load object, and an amplidyne generator having its armature connected to the armature of said motor and having its control field windings excited in response to the output voltage of said discriminator to control said motor to move said load object and to rotate said rotor member in a direction to restore said predetermined phase relationship between the voltages supplied to said input circuits of said discriminator.

2. A programming control system comprising a magnetic recording and playback tape, first and second recording and playback head coils cooperating therewith, a source of alternating voltage and connections from said source to said first coil for causing said coil to record a reference voltage on said tape, a movable load object, a rotary induction device having a rotor member connected to said load object and a stator member, a primary winding on one of said members and a secondary winding on the other of said members, connections from said source for supplying an alternating voltage to said primary winding, connections from said secondary winding to said second coil to provide for recording on said tape an alternating voltage having a phase relationship to said reference voltage varying with movements of said object, a phase discriminator having two input circuits and a direct voltage output circuit with the direct voltage changing in polarity in response to opposite departures from a predetermined phase relationship of the input voltages and varying in magnitude with variations in the phase relationship of said input voltages, switching means for disconnecting said primary winding and said coil from said source and said second coil from said secondary winding and for connecting said first coil to said primary winding and said second coil and said secondary winding to respective input circuits of said discriminator, and driving means responsive to the direct voltage output of said discriminator for moving said object in a direction to restore said predetermined phase relationship of the voltages supplied to the input circuits of said discriminator.

3. A programming control system comprising a magnetic recording and playback tape, first and second recording and playback head coils arranged in cooperative relationship with said tape, a source of single phase voltage, connections from said source to said first coil to provide for recording a reference voltage on said tape, a movable load object, a rotary induction device having a rotor member connected to said load object and a stator member, a three phase winding on one of said members and a single phase winding on the other of said members, an amplifier unit having a single phase input supplied from said source, a two phase output and a Scott connected transformer having a two phase primary winding connected to said two phase output and a three phase secondary winding connected to said three phase winding of said induction device, connections from said single phase winding to said second coil to provide for recording on said tape a voltage having a phase relationship with said reference voltage varying with movements of said object, a phase discriminator having two input circuits and a direct voltage output circuit with the direct voltage changing in polarity in response to opposite departures from a predetermined phase relationship of the input voltages and varying in magnitude with variations in the phase relationship of said input voltages, switching means for disconnecting said amplifier and said first coil from said source and said second coil from said single phase winding and for connecting said first coil to the input of said amplifier and said second coil and said single phase winding to respective input circuits of said discriminator, and driving means responsive to the direct voltage output of said discriminator for effecting a movement of said object to a position in which the voltages supplied to the input circuits of said discriminator are in phase.

4. A programming control system for recording and reproducing movements of an object comprising a magnetic recording and playback tape having first and second recording and playback head coils cooperating therewith, a source of single phase voltage connected to said first coil to provide for recording a reference voltage on said tape, a movable object, a rotary induction device having a rotor member connected to said object and a stator member, a three phase winding on one of said members, a single phase winding on the other of said members, an amplifier unit supplied from said source and having a two phase output and a Scott connected transformer having a two phase primary winding connected to said two phase output and a three phase secondary winding connected to said three phase winding of said induction device, connections from said single phase winding to said second coil to provide for recording on said tape a voltage having a phase relationship with said reference voltage varying with movements of said object, a phase discriminator having two input circuits and a direct voltage output circuit with the direct voltage changing in polarity with reversal in the phase relationship of the input voltages and varying in magnitude with variations in the phase relationship of said input voltages, switching means for disconnecting said amplifier and said first coil from said source and said second coil from said single phase winding and for connecting said first coil to said input of said amplifier and said second coil and said single phase winding to respective input circuits of said discriminator, and driving means including an electric motor responsive to the magnitude and polarity of said direct voltage for driving said object toward a position in which the voltages supplied to said input circuits of said discriminator are in phase.

ORRIN W. LIVINGSTON.
LAWRENCE R. PEASLEE.

REFERENCES CITED

The following references are of record in the file of this patent:

UNITED STATES PATENTS

| Number | Name | Date |
| --- | --- | --- |
| Re. 16,667 | Hewlett et al. | July 5, 1927 |
| 2,459,253 | Tyrner | Jan. 18, 1949 |
| 2,475,245 | Leaver et al. | July 5, 1949 |